(12) United States Patent
Yamada et al.

(10) Patent No.: US 10,320,536 B2
(45) Date of Patent: *Jun. 11, 2019

(54) COMMUNICATION SYSTEM AND MOBILE STATION APPARATUS

(71) Applicant: SHARP KABUSHIKI KAISHA, Sakai (JP)

(72) Inventors: Shohei Yamada, Osaka (JP); Katsunari Uemura, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,002

(22) Filed: Apr. 12, 2017

(65) Prior Publication Data

US 2017/0222786 A1 Aug. 3, 2017

Related U.S. Application Data

(63) Continuation of application No. 13/132,632, filed as application No. PCT/JP2009/069039 on Nov. 9, 2009, now Pat. No. 9,768,922.

(30) Foreign Application Priority Data

Dec. 4, 2008 (JP) ................................. 2008-309776

(51) Int. Cl.
*H04L 5/00* (2006.01)
*H04W 72/00* (2009.01)
(Continued)

(52) U.S. Cl.
CPC ............ *H04L 5/001* (2013.01); *H04L 5/0053* (2013.01); *H04L 5/0091* (2013.01); *H04W 72/00* (2013.01);
(Continued)

(58) Field of Classification Search
None
See application file for complete search history.

(56) References Cited

U.S. PATENT DOCUMENTS

| | | | |
|---|---|---|---|
| 8,498,649 B2 | 7/2013 | Seo et al. | |
| 8,514,793 B2 | 8/2013 | Gauvreau et al. | |

(Continued)

OTHER PUBLICATIONS

Final Office Action dated Jul. 9, 2014 in U.S. Appl. No. 13/132,632.
(Continued)

*Primary Examiner* — Michael J Moore, Jr.
(74) *Attorney, Agent, or Firm* — Birch, Stewart, Kolasch & Birch, LLP

(57) ABSTRACT

Disclosed are a communication system, a base station apparatus, a mobile station apparatus, and a method for communication, which facilitate efficient administration of information for settings maintained by base station apparatuses and mobile station apparatuses in a system involving a plurality of component carriers. A mobile communications system including the base station apparatus and the mobile station apparatus administers the system information of one or more component carriers possessing select spectrum width from the system spectrum. When a component carrier is added to the mobile station apparatus, the system applies the system information belonging to the component carriers already connected to the system to the component carrier added thereto.

6 Claims, 8 Drawing Sheets

(51) Int. Cl.
  *H04W 72/04* (2009.01)
  *H04W 48/12* (2009.01)
  *H04W 74/00* (2009.01)
(52) U.S. Cl.
  CPC .......... *H04W 72/042* (2013.01); *H04W 48/12* (2013.01); *H04W 74/00* (2013.01)

(56) References Cited

U.S. PATENT DOCUMENTS

| 8,705,461 | B2 | 4/2014 | Bala et al. |
| 2008/0159184 | A1 | 7/2008 | Niwano |
| 2010/0080187 | A1 | 4/2010 | Papasakellariou et al. |
| 2011/0098074 | A1 | 4/2011 | Seo et al. |
| 2011/0268032 | A1 | 11/2011 | Kim et al. |
| 2011/0274066 | A1 | 11/2011 | Tee et al. |
| 2013/0178221 | A1 | 7/2013 | Jung et al. |

OTHER PUBLICATIONS

Office Action dated Sep. 16, 2013 in U.S. Appl. No. 13/132,632.
Ericsson, "Carrier aggregation in LTE-Advanced", R1-082468, TSG-RAN WG1 #53bis Warsaw, Poland, Jun. 30-Jul. 4, 2008.
Qualcomm Europe, "RAN3 Impact of Dual Carrier HSDPA", R3-082614, 3GPP TSG-RAN WG3 Meeting #61 bis, Prague, Czech Republic, Sep. 30-Oct. 3, 2008.
International Search Report, dated Jan. 19, 2010, issued in PCT/JP2009/069039.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.4.0, Mar. 2008, pp. 1-126.
CMCC, "Multicarrier Operation and PDCCH design of Carrier Aggregation", 3GPP TSG RAN WG1 meeting #55, Prague, Czech Republic, Nov. 10-14, 2008, R1-084333 (4 pages).
Ericsson, "Control plane aspects of carrier aggregation", 3GPP TSG-RAN WG2 #66, San Francisco, USA, May 4-8, 2009, Tdoc R2-092958 (4 pages).
Huawei, "Carrier Aggregation in Advanced E-UTRA", 3GPP Draft, R1-082448, 3rd Generation Partnership Project (3GPP), Mobile Competence Centre, 650, Route Des Lucioles; F-06921 Sophia-Antipolis Cedex; France, vol. RAN WG1, no. Warsaw, Poland; Jun. 25, 2008, XP050110721, [retrieved Jun. 25, 2008] 4 pages.
Nokia et al., "L1 control signaling with carrier aggregation in LTE-Advanced", 3GPP TSG-RAN WG1 Meeting #54bis, Prague, Czech Republic, Sep. 29-Oct. 3, 2008, R1-083730 (6 pages).
NTT DoCoMo, "Initial Access Procedure for Asymmetric Wider Bandwidth in LTE-Advanced", 3GPP TSG RAN WG1 Meeting #54bis, Prague, Czech Republic, Sep. 29-Oct. 3, 2008, R1-083680 (5 pages).
Ericsson, LG Electronics Inc., Nokia Corporation, Nokia Siemens Networks, and Qualcomm: "Introduction of Dual Cell HSDPA operation", 3GPP TSG RAN WG2 meeting #64, R2-086920, Prague, Czech Republi Nov. 10-Nov. 14, 2008.

COMMUNICATION SYSTEM AND MOBILE STATION APPARATUS

CROSS REFERENCE TO RELATED APPLICATIONS

This application is a Continuation of copending application Ser. No. 13/132,632, filed on Jun. 3, 2011, which is the National Phase of PCT International Application No. PCT/JP2009/069039, filed on Nov. 9, 2009, which claims priority under 35 U.S.C. § 119(a) to Application No. 2008-309776, filed in Japan on Dec. 4, 2008, all of which are hereby expressly incorporated by reference into the present application.

TECHNICAL FIELD

The present invention relates to a communication system and a mobile station apparatus, and more particularly, to a communication system having a plurality of component carriers present therein and a mobile station apparatus used in the communication system.

BACKGROUND ART

"3GPP (3rd Generation Partnership Project)" is a project that studies and creates a specification of a portable telephone system that is based on a network formed by developing W-CDMA (Wideband-Code Division Multiple Access) and GSM (Global System for Mobile Communications).

In 3GPP, a W-CDMA scheme is standardized as a third generation cellular mobile communication system and its services are being sequentially started. HSDPA (High-Speed Downlink Packet Access) whose communication speed is further increased is also standardized and its services are also being started.

In 3GPP, consideration is advancing on a mobile communication system (hereinafter, referred to as "LTE-A (Long Term Evolution-Advanced)" or "Advanced-EUTRA") that realizes transmission and reception of data at a further higher speed by utilizing the evolution of the third generation wireless access technology (referred to as "LTE (Long Term Evolution) or EUTRA (Evolved Universal Terrestrial Radio Access)) and a system bandwidth that is further wider.

An OFDMA (Orthogonal Frequency Division Multiple Access) system has been proposed that executes multiplexes users using subcarriers that are orthogonal to each other, as a downlink communication system in EUTRA.

The OFDMA system employs techniques such as an adaptive modulation/demodulation and error correction scheme (AMCS: Adaptive Modulation and Coding Scheme) that is based on adaptive radio link control (Link Adaptation) such as channel coding.

"AMCS" is a scheme that switches between wireless transmission parameters (also referred to as "AMC mode") such as an error-correcting system, the coding rate of the error correction, and the data modulation multiple-value number due to the channel quality of each mobile station apparatus in order to efficiently execute a high speed packet data transmission.

The channel quality of each mobile station apparatus is fed back to a base station apparatus using CQI (Channel Quality Indicator).

FIG. 8 is a diagram of the channel configuration that is used in a conventional wireless communication system. The channel configuration is used in a wireless communication system such as EUTRA (see Non-Patent Literature 1). The wireless communication system depicted in FIG. 8 includes a base station apparatus 100 and mobile station apparatuses 200a, 200b, and 200c. "R01" denotes the coverage area of the base station apparatus 100 and the base station apparatus 100 communicates with the mobile station apparatuses that are present in the coverage R01.

In EUTRA, in a downlink to transmit a signal from the base station apparatus 100 to the mobile station apparatuses 200a to 200c, a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH) are used.

In EUTRA, in an uplink to transmit a signal from the mobile station apparatuses 200a to 200c to the base station apparatus 100, a physical uplink shared channel (PUSCH), a physical uplink control channel (PUCCH), and a physical random access channel (PRACH) are used.

LTE-A is based on the basic system of EUTRA. The frequency band used in a common system is continuous. In contrast, it has been proposed in LTE-A to operate a system by using a plurality of continuous or non-continuous frequency bands (hereinafter, "carrier component" or "component carrier (CC)") multi-functionally as one wide frequency band (a system band having a wide band) that is called, spectrum aggregation or carrier aggregation. One system band is configured by a plurality of component carriers each of which has a part of a band width of the system band that is an available frequency band. A mobile station apparatus of LTE or LTE-A can operate in each of the component carriers. It has been proposed that a frequency band used in downlink communication and a frequency band used in uplink communication have a different frequency bandwidth, respectively to more flexibly use the frequency band that is allocated to the mobile communication system.

PRIOR ART DOCUMENT

Non-patent Literature

Non-Patent Literature 1: 3GPP TS (Technical Specification) 36.300, V8.4.0 (2008-03), 3rd Generation Partnership Project; Technical Specification Group Radio Access Network, Evolved Universal Terrestrial Radio Access (E-UTRA) and Evolved Universal Terrestrial Radio Access Network (E-UTRAN); Overall description; Stage 2 (Release 8)

DISCLOSURE OF THE INVENTION

Problems to Be Solved By The Invention

However, in a wireless communication system that has conventionally been known, a problem has existed that it is highly inefficient for a mobile station apparatus to have wireless apparatuses that fully correspond to the number of component carriers up to the upper layer. In the wireless communication system that has conventionally been known, all pieces of configuration information need to be notified of from a base station apparatus to a mobile station apparatus when a component carrier is added and, therefore, a problem has arisen such as an increase of the overhead of a control signal and complication of the control processing.

The present invention was conceived in view of the above circumstances and the object thereof is to provide a communication system and a mobile station apparatus that can efficiently manage configuration information retained by a base station apparatus and a mobile station apparatus and that can execute communication quickly in a system where a plurality of component carriers present.

Means for Solving The Problems

A first technical means according to the present invention is a mobile station apparatus in a communication system including a base station apparatus and the mobile station apparatus, wherein the mobile station apparatus manages a configuration information parameter regarding a cell of a plurality of component carriers in a carrier aggregation in which a plurality of component carriers are configured, and wherein when a cell of a component carrier is added to the mobile station apparatus, the mobile station apparatus also applies a configuration information parameter regarding a cell of a component carrier that the mobile station apparatus currently accesses, to a cell of the added component carrier.

A second technical means according to the present invention is the mobile station apparatus of the first technical means wherein the configuration information parameter that is applied to a cell of the added component carrier is a configuration information parameter that is not notified of as a configuration information parameter to be applied to a cell of the added component carrier when a cell of the component carrier is added to the mobile station apparatus.

A third technical means according to the present invention is the mobile station apparatus of the first or the second technical means wherein the configuration information parameter that is applied to a cell of the added component carrier is a predetermined specific configuration information parameter.

A fourth technical means according to the present invention is a communication system composed of a base station apparatus and a mobile station apparatus, wherein the mobile station apparatus manages a configuration information parameter regarding a cell of a plurality of component carriers, wherein the base station apparatus notifies the mobile station apparatus of addition of a cell of a component carrier, and wherein when the cell of the component carrier is added, the mobile station apparatus applies a configuration information parameter regarding a cell of a component carrier that the mobile station apparatus currently accesses, to a cell of the added component carrier.

A fifth technical means according to the present invention is the communication system of the fourth technical means wherein the configuration information parameter that is applied to a cell of the added component carrier is a configuration information parameter that is not notified of as a configuration information parameter to be applied to a cell of the added component carrier when a cell of the component carrier is added to the mobile station apparatus.

A sixth technical means according to the present invention is the communication system of the fourth or the fifth technical means wherein the configuration information parameter that is applied to a cell of the added component carrier is a predetermined specific configuration information parameter.

Effect of the Invention

The communication system and the mobile station apparatus of the present invention can efficiently manage configuration information retained by a base station apparatus and a mobile station apparatus and can execute communication quickly in a system that has a plurality of component carriers present therein.

BEST MODES FOR CARRYING OUT THE INVENTION

Embodiments of the present invention will be described with reference to the accompanying drawings.

A first embodiment of the present invention will be described. A wireless communication system according to the first embodiment of the present invention includes one or more base station apparatuses and one or more mobile station apparatuses, and executes wireless communication therebetween. One base station apparatus configures one or more cells and one cell can hold one or more mobile station apparatuses.

Figure 1:
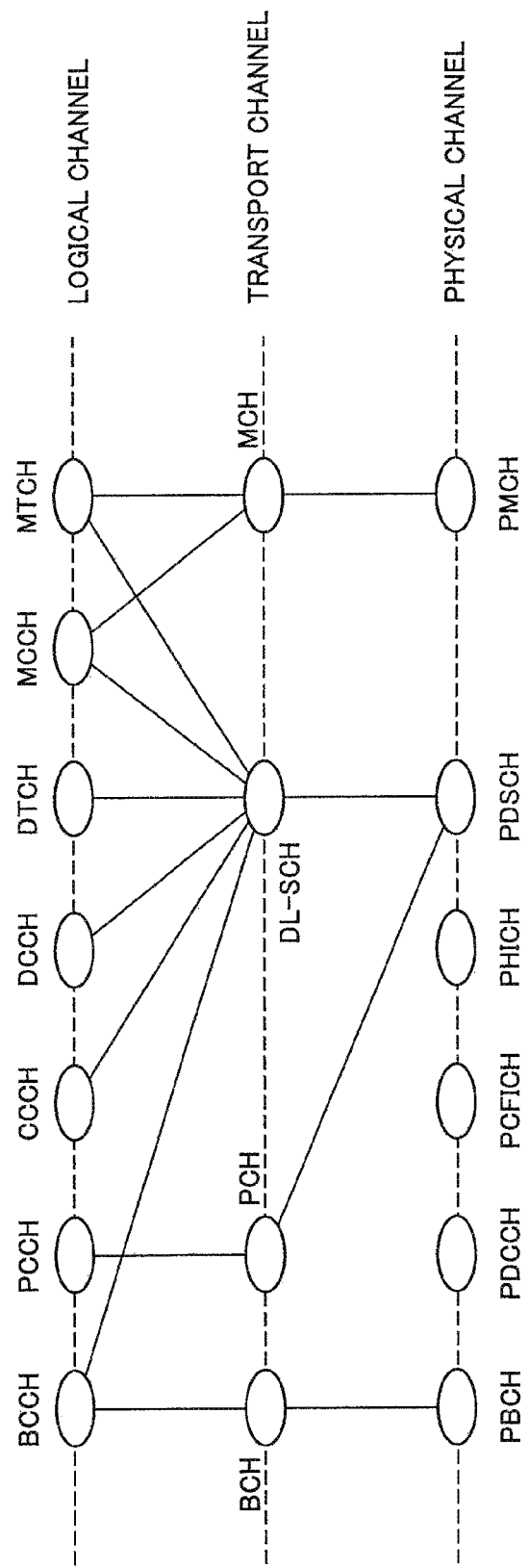
FIG. 1 is a diagram of the channel configuration of a downlink that is used in a communication system according to a first embodiment of the present invention.
Figure 2:
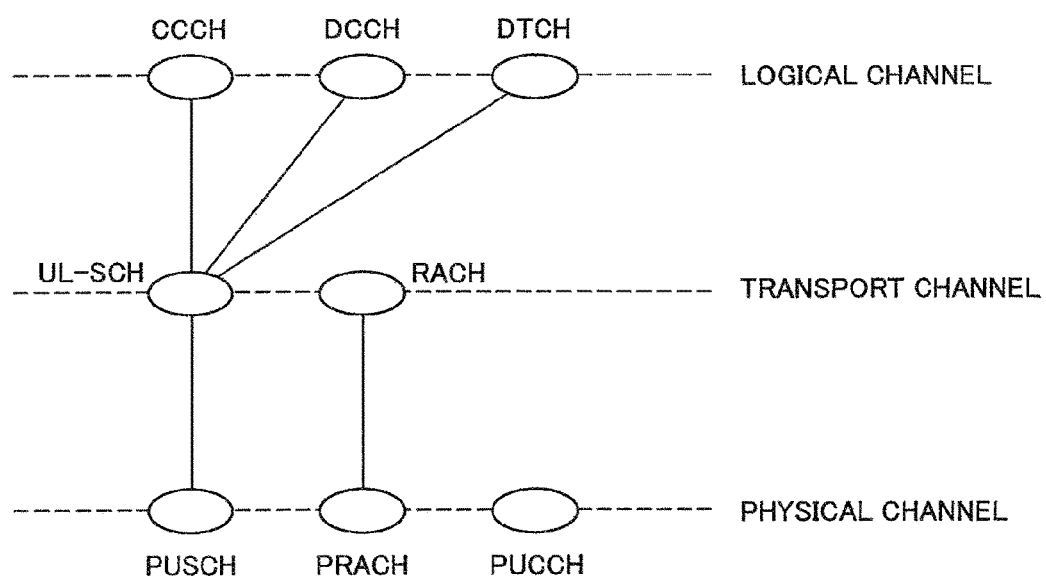
FIG. 2 is a diagram of the channel configuration of an uplink that is used in the communication system according to the first embodiment of the present invention.

FIG. 1 is a diagram of the channel configuration of a downlink that is used in the communication system according to the first embodiment of the present invention. FIG. 2 is a diagram of the channel configuration of an uplink that is used in the communication system according to the first embodiment of the present invention. A channel of the downlink depicted in FIG. 1 and a channel of the uplink depicted in FIG. 2 are configured by a logical channel, a transport channel, and a physical channel, respectively.

The logical channel defines the kind of data transmission service that is transmitted and received in a medium access control (MAC) layer. The transport channel defines what property data transmitted by a wireless interface has and how the data is transmitted. The physical channel is a physical channel that conveys the transport channel.

The logical channel of the downlink includes a broadcast control channel (BCCH), a paging control channel (PCCH), a common control channel (CCCH), a dedicated control channel (DCCH), a dedicated traffic channel (DTCH), a multicast control channel (MCCH), and a multicast traffic channel (MTCH). The logical channel of the uplink includes a common control channel (CCCH), a dedicated control channel (DCCH), and a dedicated traffic channel (DTCH).

The transport channel of the downlink includes a broadcast channel (BCH), a paging channel (PCH), a downlink shared channel (DL-SCH), and a multicast channel (MCH). The transport channel of the uplink includes an uplink shared channel (UL-SCH) and a random access channel (RACH).

The physical channel of the downlink includes a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH). The physical channel of the uplink includes a physical uplink shared channel (PUSCH), a physical random access channel (PRACH), and a physical uplink control channel (PUCCH).

Figure 7:
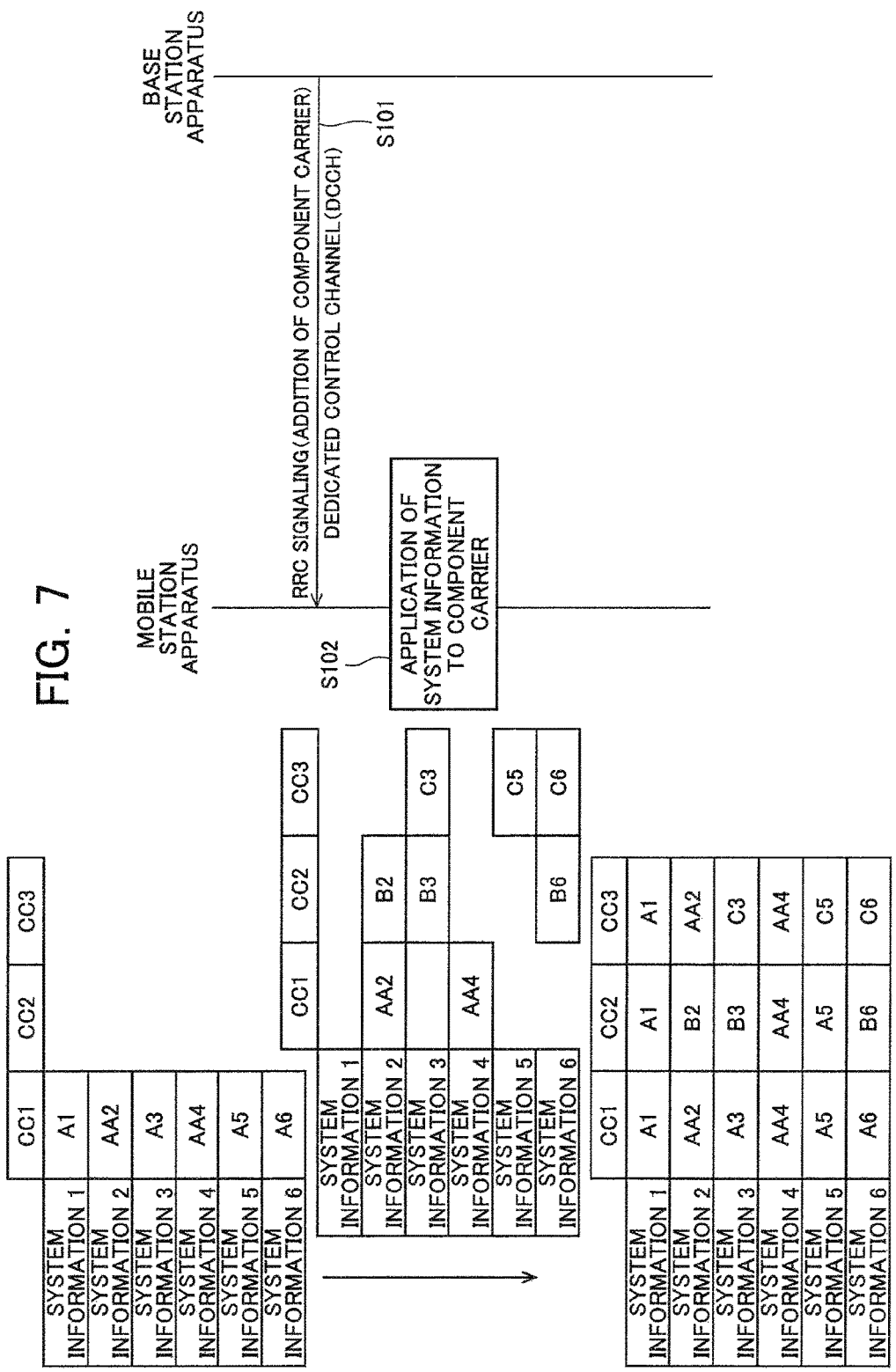
FIG. 7 is a sequence chart showing processing in the wireless communication system according to the first embodiment of the present invention.
Figure 8:
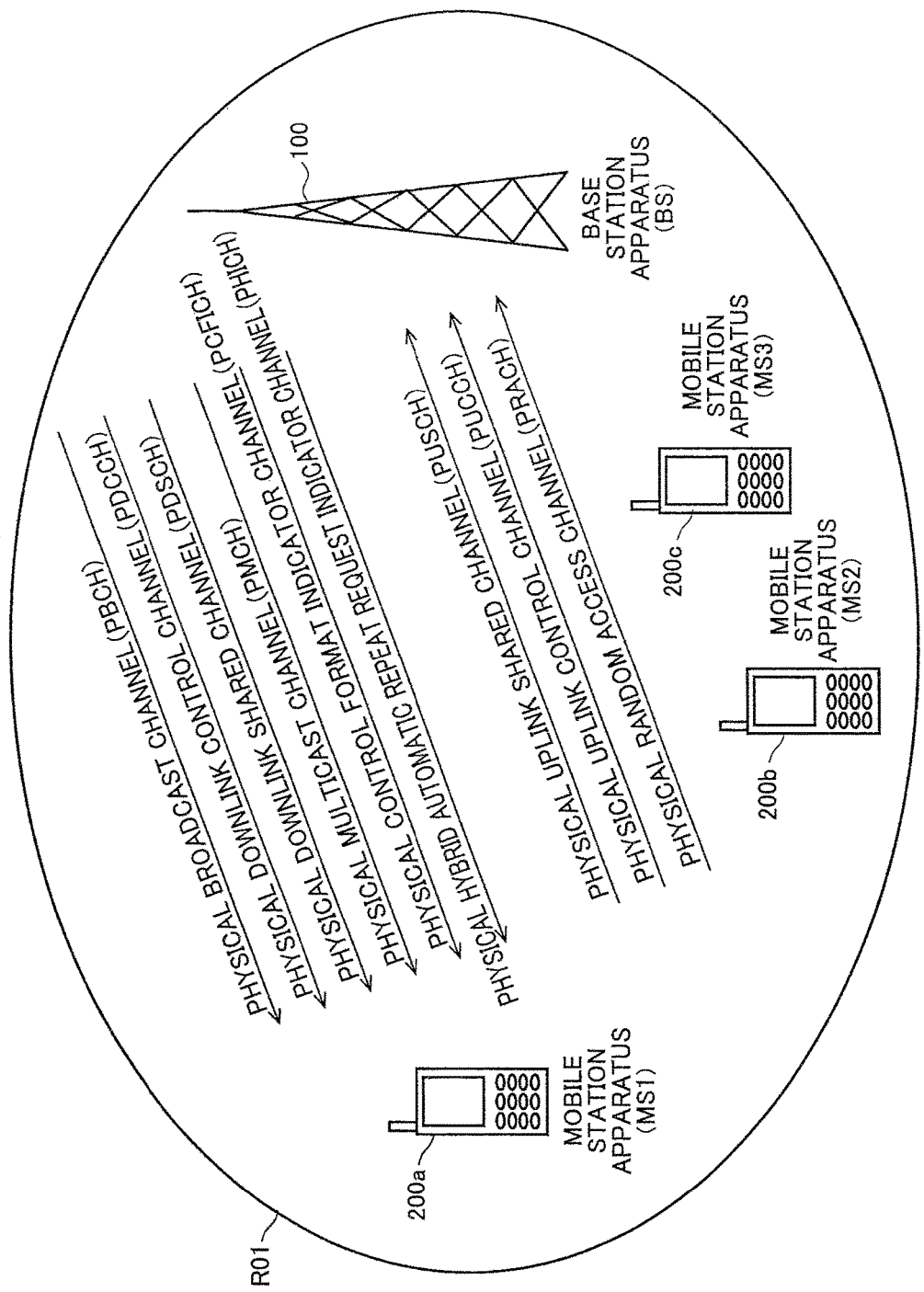
FIG. 8 is a diagram of the channel configuration that is used in a conventional communication system.

These channels are transmitted and received between the base station apparatus(es) and the mobile station apparatus (es) as depicted in FIG. 7 as described for the conventional technique.

The logical channel will be described. The broadcast control channel (BCCH) is a downlink channel that is used to broadcast system control information. The paging control channel (PCCH) is a downlink channel that is used to transmit paging information, and is used when the network does not know the position of a mobile station apparatus in the cell.

The common control channel (CCCH) is a channel that is used to transmit control information between the mobile station apparatus and the network, and is used by a mobile station apparatus that has no radio resource control (RRC) connection with the network.

The dedicated control channel (DCCH) is a bidirectional point-to-point channel and is used to transmit individual control information between the mobile station apparatus and the network. The dedicated control channel (DCCH) is used by a mobile station apparatus that has a RRC connection.

The dedicated traffic channel (DTCH) is a bidirectional point-to-point channel, is a channel dedicated to one mobile station apparatus, and is used to transfer user information (unicast data).

The multicast control channel (MCCH) is a downlink channel that is used to execute point-to-multipoint transmission of MBMS (Multimedia Broadcast Multicast Service) control information from the network to the mobile station apparatus. This is used for the MBMS service that provides point-to-multipoint services.

A transmission method of the MBMS services includes single-cell point-to-multipoint (SCPTM) transmission and multimedia broadcast multicast service single frequency network (MBSFN) transmission.

"MBSFN transmission" is a simultaneous transmission technique that is realized by simultaneously transmitting identifiable waveforms (signals) from a plurality of cells. On the other hand, "SCPTM transmission" is a method for transmitting the MBMS service by one base station apparatus.

The multicast control channel (MCCH) is used for one or a plurality of multicast traffic channels (MTCH). The multicast traffic channel (MTCH) is a downlink channel that is used to execute point-to-multipoint transmission of traffic data (MBMS transmission data) from the network to the mobile station apparatuses.

The multicast control channel (MCCH) and the multicast traffic channel (MTCH) are used only by mobile station apparatuses that receive the MBMS.

The transport channel will be described. The broadcast channel (BCH) is broadcasted to the whole cell in a transmission scheme that is fixed and defined in advance. On the downlink shared channel (DL-SCH), it is necessary that HARQ (Hybrid Automatic Repeat Request), dynamic adaptive radio link control, discontinuous reception (DRX), and MBMS transmission are supported and broadcast to the whole cell.

On the downlink shared channel (DL-SCH), beam forming is available, and dynamic resource allocation and sub-static resource allocation are supported. On the paging channel (PCH), it is necessary that DRX is supported and broadcast to the whole cell.

The paging channel (PCH) is mapped on a physical resource that is dynamically used for the traffic channel and other control channels, namely, the physical downlink shared channel (PDSCH).

The multicast channel (MCH) needs to be broadcast to the whole cell. On the multicast channel (MCH), the quasi-static resource allocation is supported such as MBSFN (MBMS Single Frequency Network) combining of the MBMS transmission from a plurality of cells and a time frame that uses expanded cyclic prefix (CP).

On the uplink shared channel (UL-SCH), HARQ, and the dynamic adaptive radio link control are supported. On the uplink shared channel (UL-SCH), beam forming is available, and the dynamic resource allocation and the quasi-static resource allocation are supported. On the random access channel (RACH), limited control information is transmitted and a risk of collision is present.

The physical channels will be described. The physical broadcast channel (PBCH) maps the broadcast channel (BCH) at 40-millisecond intervals. The timing of 40 milliseconds is blind-detected. That is, no explicit signaling needs to be executed to present the timing. A sub-frame that includes the physical broadcast channel (PBCH) can be decoded by the sub-frame alone (that is, self-decodable).

The physical downlink control channel (PDCCH) is a channel that is used to notify the mobile station apparatus of resource allocation for the downlink shared channel (PDSCH), hybrid automatic repeat request (HARQ) information for downlink data, and an uplink transmission permission (uplink grant) that is the resource allocation for the physical uplink shared channel (PUSCH).

The physical downlink shared channel (PDSCH) is a channel that is used to transmit downlink data or paging information. The physical multicast channel (PMCH) is a channel that is used to transmit the multicast channel (MCH), and is provided with a downlink reference signal, an uplink reference signal, and a physical downlink synchronization signal, separately.

The physical uplink shared channel (PUSCH) is a channel that is used to mainly transmit uplink data (UL-SCH). When the base station apparatus 100 schedules for the mobile station apparatus 200, a channel feedback report (a channel quality indicator "CQI", a pre-coding matrix indicator "PMI", and a rank indicator "RI" for the downlink) and a HARQ acknowledgment (ACK: Acknowledgment/NACK: negative acknowledgment) to downlink transmission are also transmitted using the physical uplink shared channel (PUSCH).

The physical random access channel (PRACH) is a channel that is used to transmit a random access preamble and has a guard time. The physical uplink control channel (PUSCH) is a channel that is used to transmit the channel feedback report (CQI, PMI, and RI), a scheduling request (SR), a HARQ for downlink transmission, an acknowledgment/negative acknowledgment, etc.

The physical control format indicator channel (PCFICH) is a channel that is used to notify the mobile station apparatuses of the number of OFDM symbols that are used for the physical downlink control channel (PDCCH), and is transmitted in each sub-frame.

The physical hybrid automatic repeat request indicator channel (PHICH) is a channel that is used to transmit the HARQ ACK/HACK to the uplink transmission.

Channel mapping by the communication system according to the first embodiment of the present invention will be described.

As depicted in FIG. 1, in a downlink, mapping of the transport channel and that of the physical channel are executed as follows. The broadcast channel (BCH) is mapped onto the physical broadcast channel (PBCH).

The multicast channel (MCH) is mapped onto the physical multicast channel (PMCH). The paging channel (PCH) and the downlink shared channel (DL-SCH) are mapped onto the physical downlink shared channel (PDSCH).

The physical downlink control channel (PDCCH), the physical hybrid automatic repeat request indicator channel (PHICH), and the physical control format indicator channel (PCFICH) are used as a physical channel alone.

On the other hand, in the uplink, mapping of the transport channel and that of the physical channel are executed as described below. The uplink shared channel (UL-SCH) is mapped onto the physical uplink shared channel (PUSCH).

The random access channel (RACH) is mapped onto the physical random access channel (PRACH). The physical uplink control channel (PUCCH) is used as a physical channel alone.

In the downlink, mapping of the logical channel and that of the transport channel are executed as described below. The paging control channel (PCCH) is mapped onto the paging channel (PCH).

The broadcast control channel (BCCH) is mapped onto the broadcast channel (BCH) and the downlink shared channel (DL-SCH). The common control channel (CCCH), the dedicated control channel (DCCH), and the dedicated traffic channel (DTCH) are mapped onto the downlink shared channel (DL-SCH).

The multicast control channel (MCCH) is mapped onto the downlink shared channel (DL-SCH) and the multicast channel (MCH). The multicast traffic channel (MTCH) is mapped onto the downlink shared channel (DL-SCH) and the multicast channel (MCH).

The mapping from the multicast control channel (MCCH) and the multicast traffic channel (MTCH) to the multicast channel (MCH) is executed when the MBSFN is transmitted. On the other hand, this mapping is mapped onto the downlink shared channel (DL-SCH) when the SCPTM is transmitted.

On the other hand, in the uplink, mapping of the logical channel and that of the transport channel are executed as described below. The common control channel (CCCH), the dedicated control channel (DCCH), and the dedicated traffic channel (DTCH) are mapped onto the uplink shared channel (UL-SCH). The random access channel (RACH) is not mapped with any logical channel.

The configuration of a frame that is used in the wireless communication system according to the first embodiment of the present invention will be described.

Figure 3:
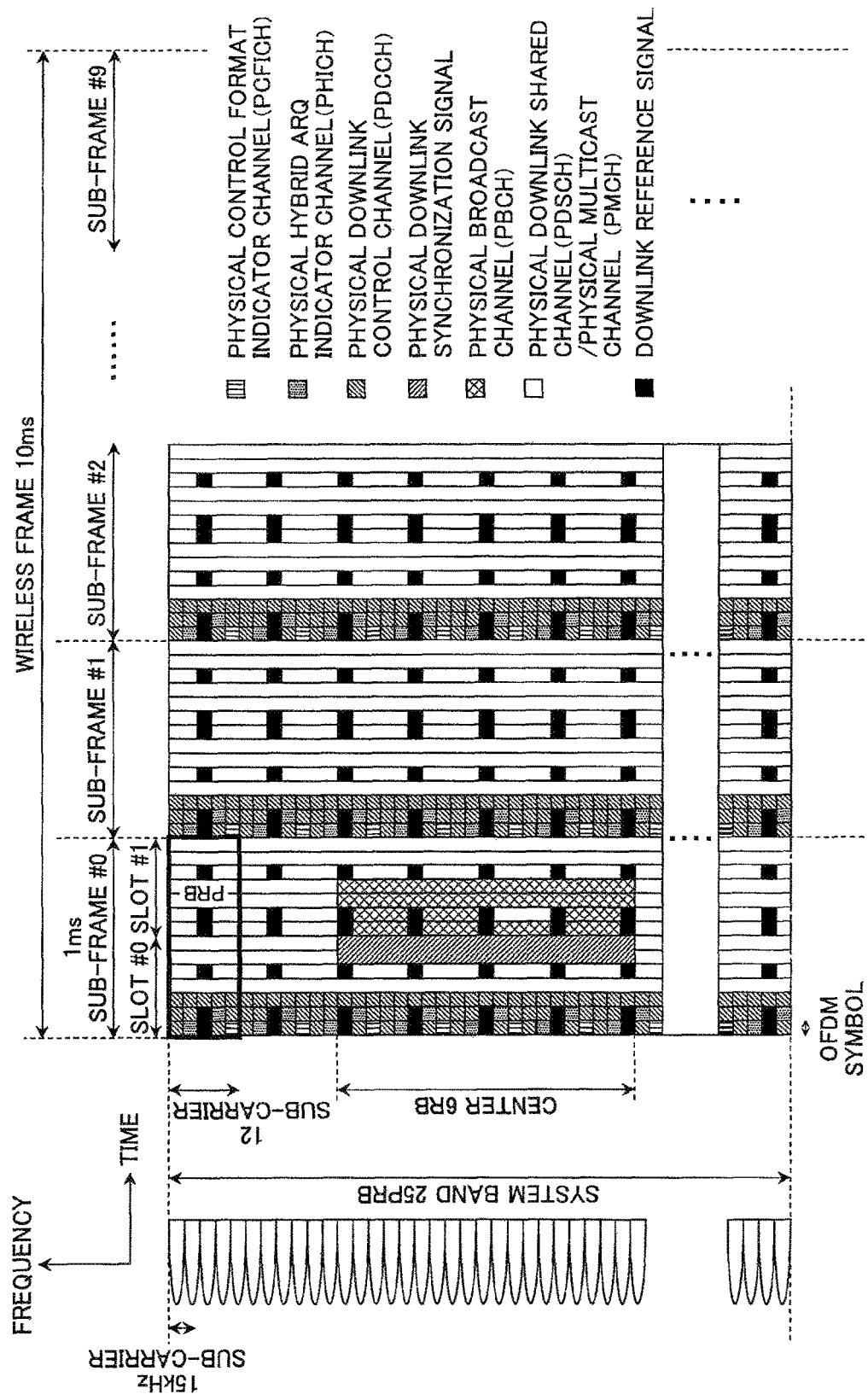
FIG. 3 is a diagram of the frame configuration that is used in the downlink of the communication system according to the first embodiment of the present invention.
Figure 4:
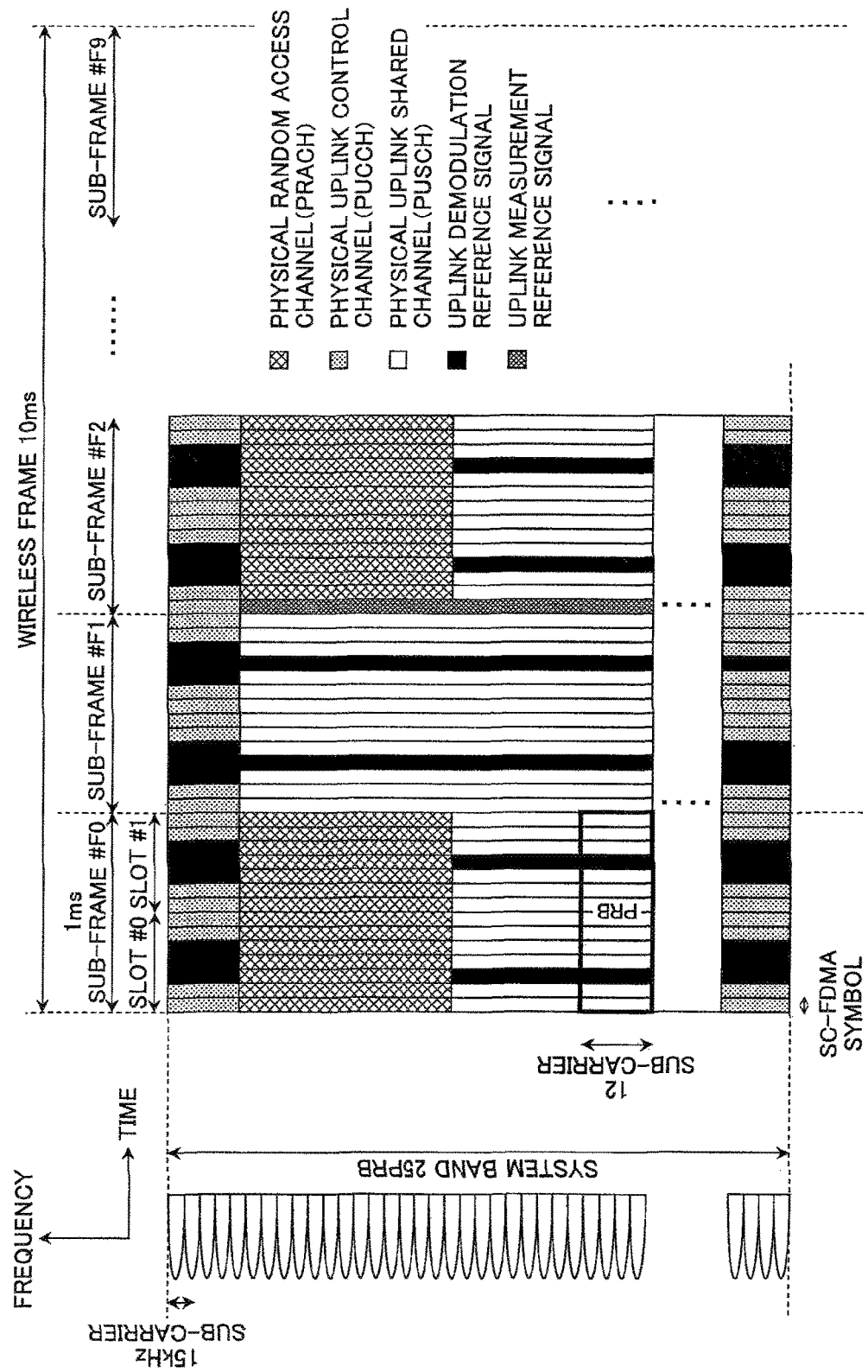
FIG. 4 is a diagram of the frame configuration that is used in the uplink of the communication system according to the first embodiment of the present invention.

FIG. 3 is a diagram of the frame configuration that is used in the downlink of the communication system according to the first embodiment of the present invention. FIG. 4 is a diagram of the frame configuration that is used in the uplink of the communication system according to the first embodiment of the present invention. In each of FIGS. 3 and 4, the axis of abscissa represents the time and the axis of ordinate represents the frequency.

A wireless frame that is identified by a system frame number (SFN) is configured by 10 milliseconds (10 msec). One sub-frame is configured by one millisecond (one msec). A wireless frame includes 10 sub-frames #F0 to "F9.

As depicted in FIG. 3, the physical control format indicator channel (PCFICH), the physical hybrid automatic repeat request indicator channel (PHICH), the physical downlink control channel (PDCCH), the physical downlink synchronization signal, the physical broadcast channel (PBCH), the physical downlink shared channel (PDSCH)/the physical multicast channel (PMCH), and the downlink reference signal are located in a wireless frame that is used in the downlink.

As depicted in FIG. 4, the physical random access channel (PRACH), the physical uplink control channel (PUCCH), the physical uplink shared channel (PUSCH), an uplink decoding reference signal, and an uplink measurement reference signal are located in the wireless frame that is used in the uplink.

One sub-frame (for example, the sub-frame #F0) is divided into two slots #S0 and #S1. When a normal cyclic prefix (normal CP) is used, a slot in the downlink is configured by seven OFDM symbols (see FIG. 3) and a slot in the uplink is configured by seven SC-FDMA (Single Carrier-Frequency Division Multiple Access) symbols (see FIG. 4).

When an expanded CP (also referred to as "long CP" or "extended CP") is used, a slot in the downlink is configured by six OFDM symbols and a slot in the uplink is configured by six SC-FDMA symbols.

One slot is divided into a plurality of blocks in the direction of the frequency. One physical resource block (PRB) is configured using 12 sub-carriers at 15 kHz as the unit in the direction of the frequency. The number of physical resource blocks (PRBs) is supported from six to 110 depending on the system bandwidth. FIGS. 3 and 4 depict the case where the number of physical resource blocks (PRBs) is 25. Different system bandwidths can also be used in the uplink and the downlink. 6 to 110 physical resource blocks (PRBs) can be supported depending on the total system bandwidth. A component carrier is usually configured by 100 physical resource blocks. A guard band is inserted between component carriers and five component carriers can be configured for 500 physical resource blocks as the whole system bandwidth. Representing the above using bandwidths, for example, a component carrier is configured by 20 MHz, a guard band is inserted between component carriers, and five component carriers can be configured for 100 MHz as the whole system bandwidth.

The resource allocation for the downlink and that for the uplink are executed by sub-frame by sub-frame in the direction of time and by physical resource block (PRBs) by physical resource block in the direction of the frequency. Two slots in a sub-frame are allocated using one resource allocation signal.

The unit that is configured by a sub-carrier and an OFDM symbol, or a sub-carrier and an SC-FDMA symbol is referred to as "resource element". A modulation symbol, etc., are mapped onto each resource element in a resource mapping process in the physical layer.

In a process in the physical layer of the downlink transport channel, a 24-bit cyclic redundancy check (CRC) to the physical downlink shared channel (PDSCH), channel coding (transmission path coding), the physical layer HARQ process, channel interleaving, scrambling, modulation (QPSK (Quadrature Phase Shift Keying), 16QAM (Quadrature Amplitude Modulation), and 64QAM), layer mapping, precoding, resource mapping, and antenna mapping are executed.

On the other hand, in a process in the physical layer of the uplink transport channel, a 24-bit cyclic redundancy check (CRC) to the physical uplink shared channel (PDSCH), channel coding (transmission path coding), the physical layer HARQ process, scrambling, modulation (QPSK, 16QAM, and 64QAM), resource mapping, and antenna mapping are executed.

The physical downlink control channel (PDCCH), the physical hybrid automatic repeat request indicator channel (PHICH), and the physical control format indicator channel (PCFICH) are located below the first 30 FDM symbols.

In the physical downlink control channel (PDCCH), a transport format (that defines the modulation scheme, the coding scheme, the transport block size, etc.), the resource allocation, and the HARQ information for each of the downlink shared channel (DL-SCH) and the paging channel (PCH) are transmitted.

In the physical downlink control channel (PDCCH), a transport format (that defines the modulation scheme, the coding scheme, the transport block size, etc.), the resource allocation, and the HARQ information for the uplink shared channel (UL-SCH) are transmitted.

A plurality of physical downlink control channels (PDCCHs) are supported and the mobile station apparatus monitors the set of the physical downlink control channels (PDCCHs).

The physical downlink shared channel (PDSCH) allocated by the physical downlink control channel (PDCCH) is mapped onto the same sub-frame as that of the physical downlink control channel (PDCCH).

The physical uplink shared channel (PUSCH) allocated by the physical downlink control channel (PDCCH) is mapped onto a sub-frame at a predetermined position. For example, when the downlink sub-frame number of the physical downlink control channel (PDCCH) is "N", the physical uplink shared channel (PUSCH) is mapped onto an uplink sub-frame whose number is "N+4".

The mobile station apparatus is identified using 16-bit MAC layer identification information (MAC ID) in the resource allocation in the uplink/downlink by the physical downlink control channel (PDCCH). This 16-bit MAC layer identification information (MAC ID) is included in the physical downlink control channel (PDCCH).

The downlink reference signal (downlink pilot channel) that is used for measurement of the state of the downlink and demodulation of the downlink data is located in each of the first and the second OFDM symbols from the head and the third OFDM symbol from the last of each slot.

On the other hand, an uplink demodulation reference signal (demodulation pilot (DRS: Demodulation Reference Signal)) that is used for demodulation of the physical uplink shared channel (PUCCH) is transmitted using the fourth SC-FDMA symbol of each slot.

The uplink measurement reference signal (scheduling pilot (SRS: Sounding Reference Signal)) that is used for the measurement of the state of the uplink is transmitted using the last SC-FDMA symbol of a sub-frame.

The demodulation reference signal of the physical uplink control channel (PUCCH) is defined for each format of the physical uplink control channel and is transmitted using the third, the fourth, and the fifth SC-FDMA symbols of each slot or the second and the sixth SC-FDMA symbols of each slot.

The physical broadcast channel (PBCH) and the downlink synchronization signal are located in a band that corresponds to six physical resource blocks in the center of the system band. The physical downlink synchronization signal is transmitted using the sixth and the seventh OFDM symbols of each slot of the first (sub-frame #F0) and the fifth (sub-frame #F4) sub-frames.

The physical broadcast channel (PBCH) is transmitted using the fourth and the fifth OFDM symbols of the first slot (slot #S0) and the first and the second OFDM symbols of the second slot (slot #S1) of the first sub-frame (sub-frame #F0).

The physical random access channel (PRACH) is configured by a bandwidth that corresponds to six physical resource blocks in the direction of the frequency, and one sub-frame in the direction of time. The physical random access channel (PRACH) is transmitted from the mobile station apparatus to the base station apparatus to give requests (such as a request for uplink resources, a request for an uplink synchronization, a downlink data transmission restart request, a handing-over request, a connection setting request, a reconnection request, and an MBMS service request) for various reasons.

The physical uplink control channel (PUCCH) is allocated in both ends of the system band and is configured on a physical resource block basis. Frequency hopping is executed such that the ends of the system band are alternately used among slots.

Figure 5:
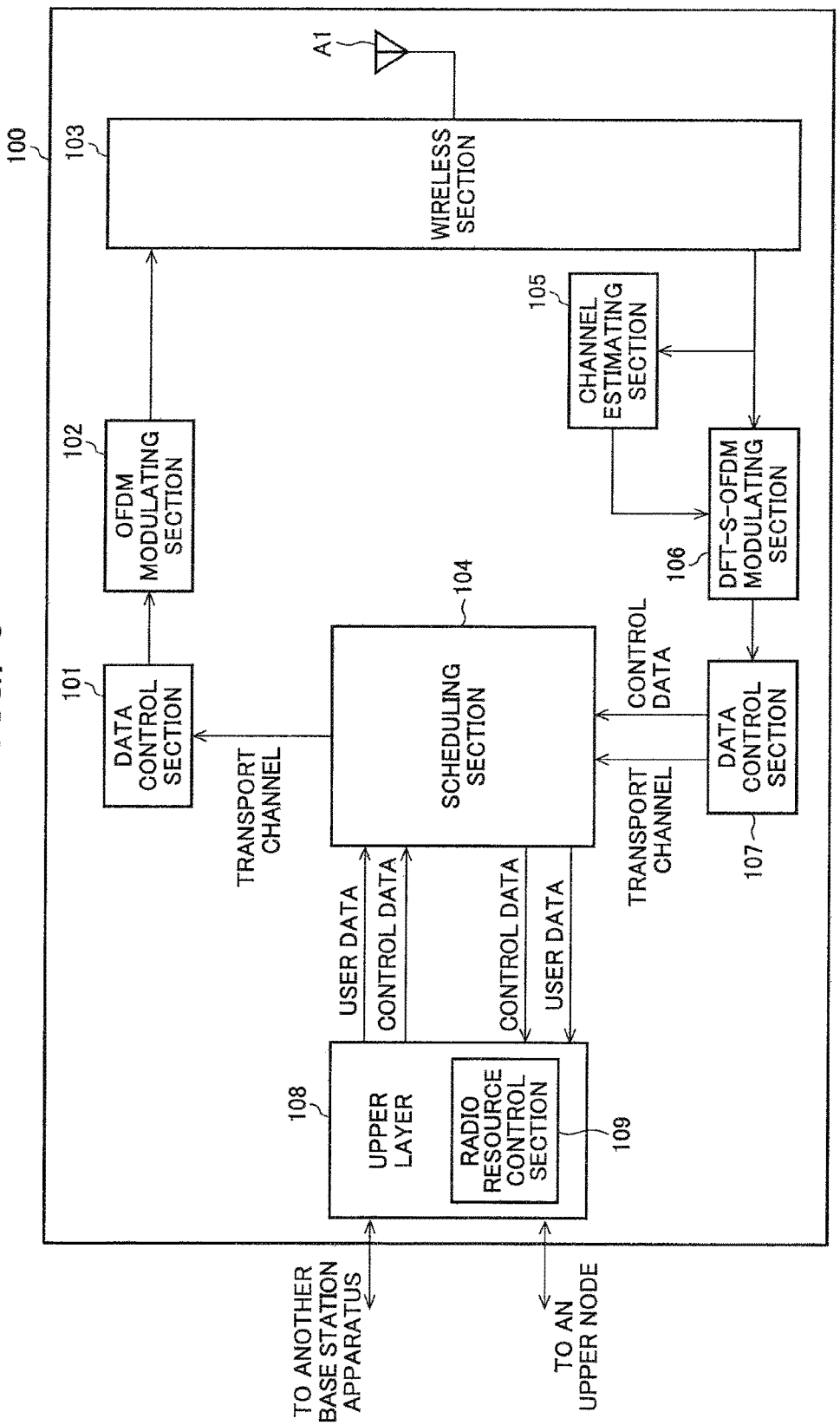
FIG. 5 is a schematic block diagram of the configuration of a base station apparatus according to the first embodiment of the present invention.

FIG. 5 is a schematic block diagram of the configuration of the base station apparatus 100 according to the first embodiment of the present invention. The base station apparatus 100 includes a data control section 101, an OFDM modulating section 102, a wireless section 103, a scheduling section 104, a channel estimating section 105, a DFT-S-OFDM (DFT-Spread-OFDM) demodulating section 106, a data extracting section 107, an upper layer 108, and an antenna section A1.

The wireless section 103, the scheduling section 104, the channel estimating section 105, the DFT-S-OFDM demodulating section 106, the data extracting section 107, the upper layer 108, and the antenna section A1 configure a receiving section. The data control section 101, the OFDM modulating section 102, the wireless section 103, the scheduling section 104, the upper layer 108, and the antenna section A1 configure a transmitting section. A section of each of the transmitting and the receiving sections is configured to separately execute processing for each component carrier, and another section thereof is configured to execute processing that is common to the component carriers.

The antenna section A1, the wireless section 103, the channel estimating section 105, the DFT-S-OFDM demodulating section 106, and the data extracting section 107 execute processing for the physical layer of the uplink. The antenna section A2, the data control section 101, the OFDM modulating section 102, and the wireless section 103 execute processing for the physical layer of the downlink.

The data control section 101 acquires the transport channel from the scheduling section 104. The data control section 101 maps the transport channel and the signals and the channels created in the physical layer based on the scheduling information input from the scheduling section 104, onto the physical channel based on the scheduling information input from the scheduling section 104. Pieces of data mapped as above are output to the OFDM modulating section 102.

The OFDM modulating section 102 executes OFDM signal processing such as coding, data modulation, serial/parallel transformation of an input signal, and IFFT (Inverse Fast Fourier Transformation) process, insertion of a cyclic pre-fix (CP), and filtering, for data that is input from the data control section 101 based on the scheduling information input from the scheduling section 104 (including downlink physical resource block (PRB) allocation information (for example, physical resource block position information such as the frequency and time), and the modulation schemes and the coding schemes that support the downlink physical resource blocks (PRBs) (including such as 16QAM modulation and a 2/3 coding rate), and the OFDM modulating section 102 creates an OFDM signal and outputs the OFDM signal to the wireless section 103.

The wireless section 103 creates a wireless signal by up-converting the modulated data that is input from the OFDM modulating section 102 into that of a wireless frequency, and transmits the up-converted data to the mobile station apparatus 200 through the antenna section A1. The wireless section 103 receives a wireless signal in the uplink from the mobile station apparatus 200 through the antenna section A1, and outputs the received signal to the channel estimating section 105 and the DFT-S-OFDM demodulating section 106 by down-converting the received signal into a baseband signal.

The scheduling section 104 executes processing for a medium access control (MAC) layer. The scheduling section 104 executes mapping of the logical channel and the transport channel, and scheduling for the downlink and the uplink (the HARQ process, selection of a transport format, etc.) and the like. The scheduling section 104 integrates the processing sections of the physical layers to control the sections and, therefore, an interface is present between the scheduling section 104, and the antenna section A1, the wireless section 103, the channel estimating section 105, the DFT-S-OFDM demodulating section 106, the data control section 101, the OFDM modulating section 102, and the data extracting section 107. However, the interface is not depicted.

In the scheduling for the downlink, the scheduling section 104 executes processing for selecting the transport format (transmission form) of the downlink to modulate each piece of data (such as allocation, the modulation scheme, and the coding scheme of the physical resource blocks (PRBs)), retransmission control in HARQ, and generation of the scheduling information to be used in the scheduling for the downlink, based on feedback information received from the mobile station apparatus 200 (including the channel feedback report of the downlink (such as the channel quality (CQI), the number of streams (RI), and pre-coding information (PMI)), information on the downlink physical resource blocks (PRBs) that are available for the mobile station apparatuses such as ACK/NACK feedback information for the downlink data), the state of a buffer, the scheduling information input from the upper layer 108, etc. The scheduling information used in the scheduling for the downlink is output to the data control section 101 and the data extracting section 107.

In the scheduling for the uplink, the scheduling section 104 executes processing for selecting the transport format (transmission form) of the uplink to modulate each piece of data (such as allocation, the modulation scheme, and the coding scheme of the physical resource blocks (PRBs)) and generation of the scheduling information to be used in the scheduling for the uplink, based on the result of estimation of the channel state (wireless propagation path state) of the uplink that is output from the channel estimating section 105, the resource allocation request from the mobile station apparatus 200, information on downlink physical resource blocks (PRBs) that are available for each mobile station apparatus 200, the scheduling information input from the upper layer 108 and the like.

The scheduling information used in the scheduling for the uplink is output to the data control section 101 and the data extracting section 107.

The scheduling section 104 maps the downlink logical channel that is input from the upper layer 108 onto the transport channel, and outputs the mapping result to the data control section 101. The scheduling section 104 processes the control data acquired in the uplink that is input from the data extracting section 107 and the transport channel as needed, and then, maps the data and the channel that are processed onto the logical channel in the uplink, and outputs the mapping result to the upper layer 108.

To demodulate the uplink data, the channel estimating section 105 estimates the channel state of the uplink from the uplink demodulation reference signal (DRS) and outputs the estimation result to the DFT-S-OFDM demodulating section 106. To execute the scheduling for the uplink, the channel estimating section 105 estimates the channel state of the uplink from the uplink measurement reference signal (SRS: Sounding Reference Signal) and outputs the estimation result to the scheduling section 104.

A single-carrier scheme such as DFT-S-OFDM is assumed as the communication scheme of the uplink. However, a multi-carrier scheme such as an OFDM scheme may be used.

The DFT-S-OFDM demodulating section 106 applies a demodulation processing to the modulated data input from the wireless section 103 by executing DFT-S-OFDM signal processing such as DFT (Discrete Fourier Transformer) transformation, sub-carrier mapping, IFFT transformation, and filtering, based on the estimation result of the uplink channel state that is input from the channel estimating section 105, and outputs the processed data to the data extracting section 107.

The data extracting section 107 checks errors in the data that is input from the DFT-S-OFDM demodulating section 106 based on the scheduling information from the scheduling section 104 and outputs the check result (positive signal ACK/negative signal HACK) to the scheduling section 104.

The data extracting section 107 separates the data input from the DFT-S-OFDM demodulating section 106 into the transport channel and the control data of the physical layer based on the scheduling information from the scheduling section 104, and outputs the channel and the data to the scheduling section 104.

The separated control data includes such as feedback information notified from the mobile station apparatus 200 (a downlink channel feedback report (CQI, PMI, and RI) and ACK/NACK feedback information for data in the downlink).

The upper layer 108 executes processing for a packet data convergence protocol (PDCP) layer, a radio link control (RLC) layer, and a radio resource control (RRC) layer. The upper layer 108 integrates processing sections of a lower layer to control the processing sections and, therefore, an interface is present between the upper layer 108 and the scheduling section 104, the antenna section A1, the wireless section 103, the channel estimating section 105, the DFT-S-OFDM demodulating section 106, the data control section 101, the OFDM modulating section 102, and the data extracting section 107. However, the interface is not depicted.

The upper layer 108 includes a radio resource control section 109. The radio resource control section 109 executes management of various pieces of configuration information, management of the system information, paging control, management of the communication state of the mobile station apparatuses, management of moving such as handing over, management of the buffer state of each mobile station apparatus, management of the connection setting of unicast and multicast bearers, management of mobile station identifiers (UEIDs), etc. The upper layer 108 delivers and receives information to another base station apparatus and information to an upper node.

Figure 6:
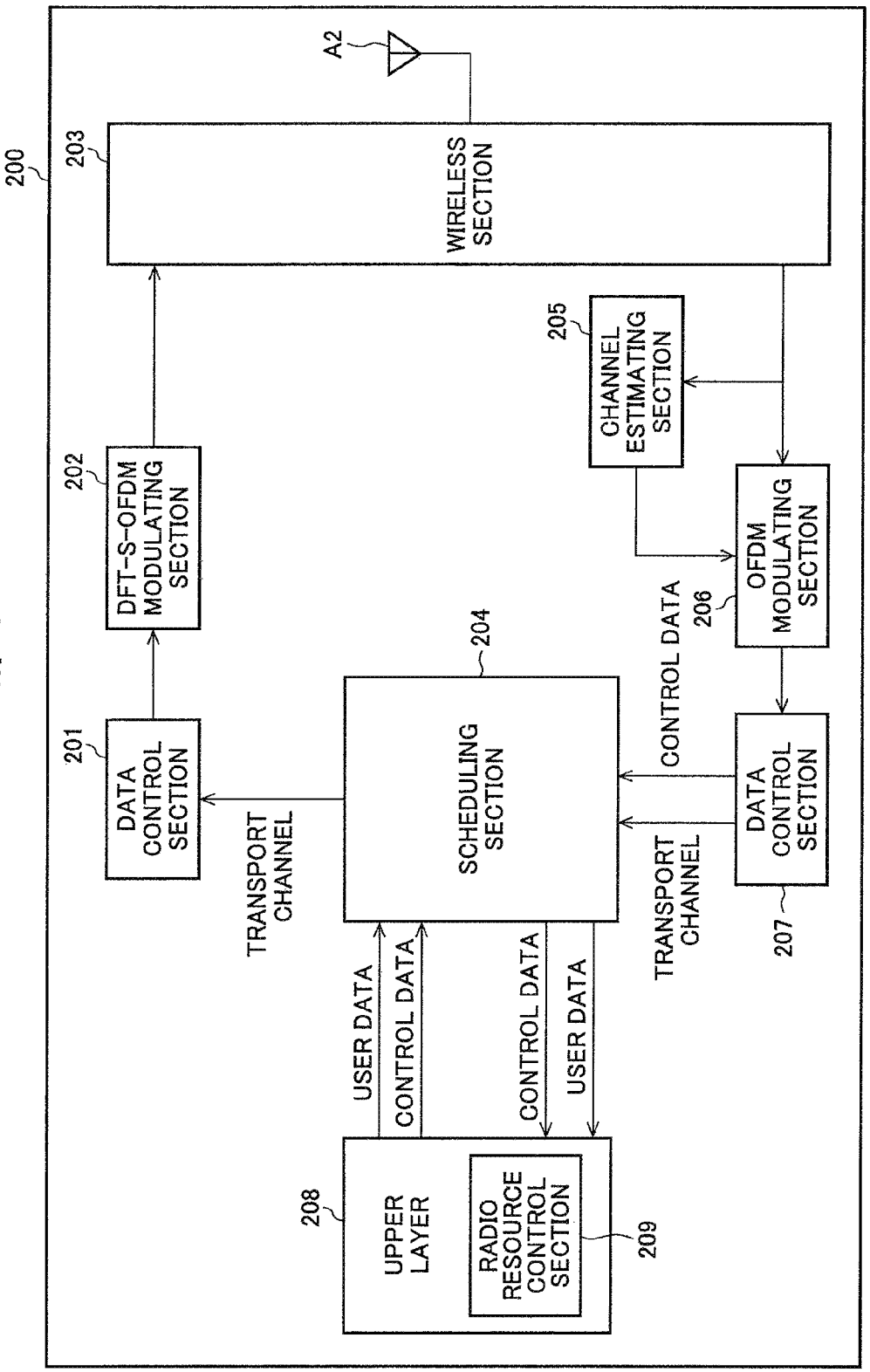
FIG. 6 is a schematic block diagram of the configuration of a mobile station apparatus according to the first embodiment of the present invention.

FIG. 6 is a schematic block diagram of the configuration of the mobile station apparatus 200 according to the first embodiment of the present invention. The mobile station apparatus 200 includes a data control section 201, a DFT-S-OFDM modulating section 202, a wireless section 203, a scheduling section 204, a channel estimating section 205, an OFDM demodulating section 206, a data extracting section 207, an upper layer 208, and an antenna section A2.

The data control section 201, the DFT-S-OFDM modulating section 202, the wireless section 203, the scheduling section 204, the upper layer 208, and the antenna section A2 configure a transmitting section. The wireless section 203, the scheduling section 204, the channel estimating section 205, the OFDM demodulating section 206, the data extracting section 207, the upper layer 208, and the antenna section A2 configure a receiving section. The scheduling section 204 configures a selecting section.

The antenna section A2, the data control section 201, the DFT-S-OFDM modulating section 202, and the wireless section 203 execute processing for the physical layer in the uplink. The antenna section A2, the wireless section 203, the channel estimating section 205, the OFDM demodulating section 206, and the data extracting section 207 execute processing for the physical layer in the downlink. A section of each of the transmitting and the receiving sections is configured to separately execute processing for each component carrier, and another section thereof is configured to execute processing common to the component carriers.

The data control section 201 acquires the transport channel from the scheduling section 104. The data control section 201 maps the signals and the channels that are created in the physical layer based on the transport channel and the scheduling information that is input from the scheduling section 204, onto the physical channel based on the scheduling information input from the scheduling section 204. Pieces of data mapped in this manner are output to the DFT-S-OFDM modulating section 202.

The DFT-S-OFDM modulating section 202 executes DFT-S-OFDM signal processing such as data modulation, a DFT process, sub-carrier mapping, an inverse fast Fourier transformation (IFFT) process, cycling prefix (CP) insertion, and filtering, for the data input from the data control section 201, thereby, generates a DFT-S-OFDM signal, and outputs the signal to the wireless section 203.

A single-carrier scheme such as DFT-S-OFDM is assumed as the communication scheme of the uplink. However, a multi-carrier scheme such as an OFDM scheme may be used instead.

The wireless section 203 generates a wireless signal by up-converting the modulated data that is input from the DFT-S-OFDM modulating section 202 to a wireless frequency, and transmits the wireless signal to the base station apparatus 100 through the antenna section A2.

The wireless section 203 receives a wireless signal that is modulated by the data in the downlink from the base station apparatus 100 through the antenna section A2, and outputs the received data to the channel estimating section 205 and the OFDM demodulating section 206 by down-converting the received wireless signal to a baseband signal.

The scheduling section 204 executes processing for the medium access control layer. The scheduling section 104 executes mapping of the logical channel and the transport channel, scheduling for the downlink and that for the uplink (the HARQ process, selection of the transport format, etc.), etc. The scheduling section 104 integrates the processing sections of the physical layers to control the processing sections and, therefore, an interface is present between the scheduling section 104, and the antenna section A2, the data control section 201, the DFT-S-OFDM modulating section 202, the channel estimating section 205, the OFDM demodulating section 206, the data extracting section 207, and the wireless section 203. However, the interface is not depicted.

In the scheduling for the downlink, the scheduling section 204 executes reception control of the transport channel, physical signals, and the physical channels, the HARQ retransmission control, and generation of the scheduling information to be used in the scheduling for the downlink based on the scheduling information (the transport format and the HARQ retransmission information) from the base station apparatus 100 and the upper layer 208. The scheduling information used in the scheduling for the downlink is output to the data control section 201 and the data extracting section 207.

In the scheduling for the uplink, the scheduling section 204 executes a scheduling processing for mapping the logical channel of the uplink that is input from the upper layer 208 onto the transport channel, and generation of the scheduling information to be used in the scheduling of the uplink, based on the state of the buffer, the scheduling information (the transport format, the HARQ retransmission information, etc.) of the uplink from the base station apparatus 100 that is input from the data extracting section 207, the scheduling information that is input from the upper layer 208, and the like.

The information reported from the base station apparatus 100 is used for the transport format of the uplink. The scheduling information is output to the data control section 201 and the data extracting section 207.

The scheduling section 204 maps the uplink logical channel that is input from the upper layer 208 onto the transport channel, and outputs the mapping result to the data control section 201. The scheduling section 204 also outputs to the data control section 201 the downlink channel feedback report (CQI, PMI, and RI) input from the channel estimating section 205 and the result of the CRC check input from the data extracting section 207.

The scheduling section 204 executes processing for the control data acquired in the downlink that is input from the data extracting section 207 and the transport channel as needed, thereafter, maps the data and the channel that are processed onto the logical channel in the downlink, and outputs the mapping result to the upper layer 208.

To demodulate the downlink data, the channel estimating section 205 estimates the channel state of the downlink from the downlink reference signal (RS) and outputs the estimation result to the OFDM demodulating section 206.

The channel estimating section 205 estimates the channel state of the downlink from the downlink reference signal (RS), converts the estimation result into a downlink channel feedback report (including channel quality information), and outputs the report to the scheduling section 204 in order to notify the base station apparatus 100 of the estimation result of the downlink channel state (wireless propagation path state).

The OFDM demodulating section 206 applies an OFDM demodulation processing to the modulated data input from the wireless section 203 based on the downlink channel state estimation result that is input from the channel estimating section 205, and outputs the resultant data to the data extracting section 207.

The data extracting section 207 executes the cyclic redundancy check (CRC) for the data input from the OFDM demodulating section 206, thereby, checks for errors in the data, and outputs the check result (ACK/NACK feedback information) to the scheduling section 204.

The data extracting section 207 separates the data input from the OFDM demodulating section 206 into the transport channel and the control data of the physical layer based on the scheduling information from the scheduling section 204, and outputs the channel and the data to the scheduling section 204. The separated control data includes the scheduling information such as the resource allocation for the downlink or the uplink and the HARQ control information of the uplink. At this time, the resource allocation for the downlink or the uplink addressed to its own station and the like are extracted by executing decode processing to a search space (also referred to as "search region") of the physical downlink control signal (PDCCH).

The upper layer 208 executes processing for the packet data convergence protocol (PDCP) layer, the radio link control (RLC) layer, and the radio resource control (RRC) layer. The upper layer 208 includes a radio resource control section 209. The upper layer 208 integrates the processing sections of the lower layer to control the processing sections and, therefore, an interface is present between the upper layer 208 and the scheduling section 204, the antenna section A2, the data control section 201, the DFT-S-OFDM modulating section 202, the channel estimating section 205, the OFDM demodulating section 206, the data extracting section 207, and the wireless section 203. However, the interface is not depicted.

The radio resource control section 209 executes management of various kinds of configuration information, management of the system information, the paging control, management of the communication state of the mobile station itself, management of moving such as handing over, management of the buffer state, management of the connection settings of unicast and multicast bearers, and management of a mobile station identifier (UEID).

Returning to the description of the first embodiment, processing of the base station apparatus 100 and that of the mobile station apparatus 200 will be described.

A "DL master region (hereinafter, also "downlink temporary component carrier") is a downlink frequency layer (a component carrier or a component carrier group) that the mobile station apparatus first acquires downlink synchronization or system information, and is a downlink frequency layer (a component carrier or a component carrier group) that the mobile station apparatus first accesses or monitors. After temporarily acquiring a signal in this region, the mobile station apparatus can access another region. A downlink synchronization signal (SCH) that can acquire at least downlink synchronization is located.

A "DL slave region" is a downlink frequency layer (a component carrier or a component carrier group) that the mobile station apparatus accesses or monitors after acquiring the information in the master region or that the mobile station apparatus accesses or monitors after an additional indication by the base station apparatus.

A "UL master region" (hereinafter, also "uplink temporary component carrier") is an uplink frequency layer (a component carrier or a component carrier group) that the mobile station apparatus first accesses, and is a component carrier or a component carrier group that is designated by the DL master region or that is correlated with the DL master region.

A "UL slave region" is an uplink frequency layer (a component carrier or a component carrier group) that the mobile station apparatus can access after communication using the UL master region or that the mobile station apparatus can access after an additional indication by the base station apparatus.

Hereinafter, a master region or a slave region simply refers to a DL master region and/or a UL master region, or a DL slave region and/or a UL slave region.

Specific channels (such as the downlink synchronization signal (SCH), the physical downlink broadcast channel (PBCH), the broadcast control channel (BCCH), the paging control channel (PCCH), the common control channel (CCCH), and/or the physical uplink control channel (PUCCH)) may not sometimes present in the slave region.

Master regions and slave regions for the mobile station apparatuses may differ from each other. A master region for a mobile station apparatus may be adapted to be a slave region for another mobile station apparatus. This represents that addition of a component carrier is executed to a mobile station apparatus using a dedicated signal and, therefore, a component carrier that is specific to the mobile station apparatus can be configured. In this case, the downlink synchronization signal (SCH) may also be located in a slave region for a mobile station apparatus.

A master region and a slave region may be allocated in carrier frequencies that are next to each other or may be allocated in carrier frequencies that are away from each other.

The mobile station apparatus manages system information fields that is each content of system information and system information element (IE) that is made up of one or a plurality of system information field. The system information (including the system information field and the system information element) is managed in RRC of the mobile station apparatus and the base station apparatus for each component carrier. The system information is a configuration information parameter that is managed by the system in which the mobile station apparatus and the base station apparatus communicate with each other, and is also a parameter that is necessary for the mobile station apparatus to operate in the system.

The system information managed in RRC is broadcast in the broadcast control channel (BCCH), or reported from the base station apparatus to the mobile station apparatus using RRC signaling of the common control channel (CCCH) and/or the dedicated control channel (DCCH).

The system information managed in RRC is managed for each component carrier as a different parameter (specific to a component carrier).

When the system information is notified of using the RRC signaling, a new type of RRC message may be prepared that notifies of the system information by indicating the component carrier number or an RRC connection reconfiguration message (RRCConnectionReconfiguration Message) may be extended to notify the system information by indicating the component carrier number.

When giving the system information in SIB (SystemInformationBlock) (a bunch of a plural pieces of system information transmitted at the same transmission cycle) using a broadcast control channel (BCCH), the system information is given by indicating the component carrier number of the component carrier to which the system information is applied. Otherwise, the component carrier in which the SIB is located that gives a notice of the system information may be the component carrier to which the system information is applied.

FIG. 7 is a sequence chart of processes of the wireless communication system according to the first embodiment of the present invention.

The mobile station apparatus manages the system information of one or a plurality of component carriers that have a portion of the bandwidth of the system band and, applies the system information of the component carrier that is currently accessed to each of the added component carrier(s) when a component carrier(s) is(are) added to the mobile station apparatus. When the component carrier(s) is(are) added to the mobile station apparatus, the mobile station apparatus applies the system information of the component carrier that the mobile station apparatus currently accesses for the system information that is not notified of as the system information to be applied to the added component carrier(s) to each of the added component carrier(s). For predetermined specific pieces of system information, the mobile station apparatus applies the system information of the component carrier that the mobile station apparatus currently accesses to each of the added component carrier(s) when the component carrier(s) are added to the mobile station apparatus. For the predetermined specific pieces of system information, the mobile station apparatus applies the system information of default values (initial values) to each of the added component carrier(s) when the component carrier(s) are added to the mobile station apparatus.

Thus, it becomes possible to control efficiently without indicating the system information that is unnecessary to the control information for adding the component carrier(s). By using the component carrier that the mobile station apparatus currently accesses as the basis, discontinuation of communication associated with the addition of the component carrier(s) can be avoided.

The addition of the component carrier(s) can also be interpreted as a concept of addition of an active component carrier(s) or activation of a component carrier(s).

The information on the addition of the component carrier(s) (information indicating the component carrier(s) to be added, the number of component carrier(s) to be added, the frequency layer(s) of the component carrier(s) to be added, system information of the component carrier 1, system information of the component carrier 2, etc.) is notified of from the base station apparatus 100 to the mobile station apparatus 200 using the RRC connection setup (common control channel (CCCH) (RRC signaling)) during the RRC connection establishing process and the dedicated control channel (DCCH) (RRC signaling) to the mobile station apparatus 200 during communication (step S101).

At this step, the base station apparatus manages the system information of the component carrier that the mobile station apparatus currently accesses, determines whether any notice of the system information is necessary for the component carrier(s) to be added, and notifies the mobile station apparatus 200 of the information on the addition of the component carrier(s).

The mobile station apparatus 200 acquires the information on the addition of the component carrier(s) and adjusts the wireless portion 203 to be able to receive the added component carrier(s).

After acquiring the information on the addition of the component carrier(s), the mobile station apparatus 200 detects system information to be applied to each of the component carrier(s) and applies the system information to each of the component carrier(s) (step S102).

It is assumed that, for example, six pieces of system information to be managed by the mobile station apparatus are present that are system information 1 to system information 6. In the component carrier 1 (CC1), these pieces of system information are already managed and values of A1, A2, A3, A4, A5, and A6 are respectively applied thereto. At step S102, the mobile station apparatus adds the component carriers 2 (CC2) and 3 (CC3). At this step, the RRC signaling includes system information that indicated B2 for the system information 2, B3 for the system information 3, and B6 for the system information 6 of the component carrier 2 (CC2). The RRC signaling in this case includes system information that indicated C3 for the system information 3, C5 for the system information 5, and C6 for the system information 6 of the component carrier 3 (CC3). The RRC signaling in this case includes an indication to change from A2 to AA2 for the system information 2 and an indication to change from A4 to AA4 for the system information 4 of the component carrier 1 (CC1).

The mobile station apparatus receives the RRC signaling and applies the pieces of system information indicated for each component carriers. The system information used for the component carrier 1 (CC1) is applied to the system information that is not indicated for each of the component carriers. However, as to the system information 2, because it is indicated to modify from A2 to AA2 on the component carrier 1 (CC1), B2 indicated in the RRC signaling is applied to the component carrier 2 (CC2) and AA2 that is modified is applied to the component carrier 3 (CC3).

It is defined in advance that the pieces of system information 1 and 4 are commonly used to all the component carriers as the kind of system information without specific indication and, therefore, the system information used for the component carrier 1 (CC1) is applied as it is. However, as to the system information 4, it is indicated to modify on the component carrier 1 (CC1) and, therefore, at the same time, a value that is modified is also applied to each of the component carriers other than the component carrier 1 (CC1). Thus, the system information for each component carrier finally becomes as follows. In order of the pieces of system information 1 to 6: the values are A1, AA2, A3, AA4, A5, and A6 for the component carrier 1 (CC1); A1, B2, B3, AA4, A5, and B6 for the component carrier 2 (CC2); and A1, AA2, C3, AA4, C5, and C6 for the component carrier 3 (CC3).

A component carrier can simply be interpreted as a cell and it can be interpreted that a mobile station apparatus manages the system information for a plurality of cells. In this case, in the RRC signaling, the addition is interpreted not as addition of a component carrier(s) but as addition of an active (activated) cell(s) or activation of a cell(s). Communication using a plurality of component carriers is interpreted as communication using a plurality of active cells.

Though the above embodiments have been described assuming that the plurality of component carriers configure one system, it can also be interpreted that a plurality of systems are aggregated to configure one system. It can also be interpreted that the component carrier represents a region for the system to operate therein by setting the carrier frequency to be equal to the center of each component carrier by a specific receiving-side apparatus or a specific transmitting-side apparatus.

For the convenience of description, each of the embodiments has been described taking the example of the case where the base station apparatus and the mobile station apparatus are in a one-to-one relation. However, a plurality of base station apparatuses and a plurality of mobile station apparatuses may be employed. The mobile station apparatus is not limited to a terminal that moves around and may be realized by implementing the functions of the mobile station apparatus on the base station apparatus or a fixed terminal.

In each of the above embodiments, the base station apparatus and the mobile station apparatus may be controlled by recording a program to realize the functions of the base station apparatus and the functions of the mobile station apparatus on a computer-readable recording medium, and causing a computer system to read and execute the program recorded on the recording medium. The "computer system" used herein includes an OS and hardware such as peripherals.

The "computer-readable recording medium" refers to a portable medium such as a flexible disc, a magneto-optical disc, a ROM, or a CD-ROM; or a recording apparatus such as a hard disc incorporated in a computer system. The "computer-readable recording medium" includes a medium that dynamically retains a program for a short time such as a communication cable used when a program is transmitted through a network such as the Internet or a communication line such as a telephone line and a medium that retains a program for a specific length of time such as a volatile memory in a computer system that acts as a server or a client in the above case. The program may be a program to realize some of the above functions or may also be a program that can realize the above functions by being combined with programs that are already recorded on the computer system.

The embodiments of the present invention have been described with reference to the accompanying drawings. However, the specific configurations are not limited to those in the embodiments and designs, etc., within the scope not departing from the purview of the present invention are included in the claims.

EXPLANATIONS OF REFERENCE NUMERALS

100 . . . base station apparatus, 101 . . . data control section, 102 . . . OFDM modulating section, 103 . . . wireless section, 104 . . . scheduling section, 105 . . . channel estimating section, 106 . . . DFT-S-OFDM demodulating section, 107 . . . data extracting section, 108 . . . upper layer, 200 . . . mobile station apparatus, 201 . . . data control section, 202 . . . DFT-S-OFDM modulating section, 203 . . . wireless section, 204 . . . scheduling section, 205 . . . channel estimating section, 206 . . . OFDM demodulating section, 207 . . . data extracting section, 208 . . . upper layer, A1, A2 . . . antenna section

The invention claimed is:

1. A mobile station apparatus which communicates with a base station apparatus with carrier aggregation by using cells that are currently configured to the mobile station apparatus, the mobile station apparatus comprising:
   circuitry configured to configure parameters regarding a first cell of the cells currently configured to the mobile station apparatus, wherein
   in a case where the mobile station apparatus receives from the base station apparatus a message indicating an addition of a second cell of the cells, the circuitry is further configured to apply, to the added second cell, a first parameter which is included in the parameters regarding the first cell,
   a second parameter regarding the second cell is included in the message indicating the addition of the second cell,
   the first parameter is not included in the message indicating the addition of the second cell, and
   the first parameter is commonly used for all of the cells that are currently configured for carrier aggregation to the mobile station apparatus.

2. The mobile station apparatus as defined in claim 1, wherein the first parameter to be applied to the added second cell is specifically predetermined.

3. The mobile station apparatus as defined in claim 1, wherein each of the cells is a component carrier.

4. A method performed by a mobile station apparatus provided in a communication system including a base station apparatus and the mobile station apparatus which communicates with the base station apparatus with carrier aggregation by using cells that are currently configured to the mobile station apparatus, the method comprising:
   configuring parameters regarding a first cell of the cells currently configured to the mobile station apparatus; and
   in a case where the mobile station apparatus receives from the base station apparatus a message indicating an addition of a second cell of the cells, applying, to the added second cell, a first parameter which is included in the parameters regarding the first cell, wherein
   a second parameter regarding the second cell is included in the message indicating the addition of the second cell,
   the first parameter is not included in the message indicating the addition of the second cell, and
   the first parameter is commonly used for all of the cells that are currently configured for carrier aggregation to the mobile station apparatus.

5. The method as defined in claim 4, wherein the first parameter to be applied to the added second cell is specifically predetermined.

6. The method as defined in claim 4, wherein each of the cells is a component carrier.

* * * * *